US011907965B2

(12) United States Patent
Il et al.

(10) Patent No.: US 11,907,965 B2
(45) Date of Patent: Feb. 20, 2024

(54) INFORMATION PROCESSING DEVICE, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Yukinori Il, Toyota (JP); Kenji Yamaguchi, Miyoshi (JP); Junya Ogawa, Okazaki (JP); Yuki Naganuma, Nagoya (JP); Junya Yamamoto, Seto (JP); Yuta Tone, Nagoya (JP); Naoki Ishizuka, Nagoya (JP); Tadayuki Tanaka, Nagoya (JP); Keisuke Ito, Okazaki (JP); Yuka Yokoi, Miyoshi (JP); Takashi Hayashi, Nagoya (JP); Naoya Oka, Nagakute (JP); Yu Hamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/846,718

(22) Filed: Jun. 22, 2022

(65) Prior Publication Data
US 2023/0007945 A1    Jan. 12, 2023

(30) Foreign Application Priority Data

Jul. 6, 2021   (JP) ................................. 2021-111895

(51) Int. Cl.
*G06Q 30/00*    (2023.01)
*G06Q 30/0208*  (2023.01)
*G05B 19/418*   (2006.01)

(52) U.S. Cl.
CPC ............................. *G06Q 30/0208* (2013.01)

(58) Field of Classification Search
CPC .................................................. G06Q 30/0208
See application file for complete search history.

(56) References Cited

U.S. PATENT DOCUMENTS

| | | | |
|---|---|---|---|
| 11,157,871 B1* | 10/2021 | Seol ..................... | G06Q 10/087 |
| 2004/0211600 A1* | 10/2004 | Schuller .................. | G07G 5/00 |
| | | | 177/25.15 |
| 2007/0067075 A1 | 3/2007 | McMillan et al. | |
| 2011/0153400 A1* | 6/2011 | Averbuch ............... | G06Q 30/02 |
| | | | 705/28 |
| 2012/0109660 A1 | 5/2012 | Xu et al. | |
| 2020/0126320 A1* | 4/2020 | Tanuma ............... | G07C 5/0808 |

FOREIGN PATENT DOCUMENTS

| | | |
|---|---|---|
| JP | 2008-269087 A | 11/2008 |
| JP | 2020-064552 A | 4/2020 |

OTHER PUBLICATIONS

Modeling the impact of incentives on vehicle sales volume. IEEE. 2001. (Year: 2001).*
"Toward Incentivizing Fog-Based Privacy-Preserving Mobile Crowdsensing in the Internet of Vehicles". IEEE. 2019. (Year: 2019).*

* cited by examiner

*Primary Examiner* — Maria V Vanderhorst
(74) *Attorney, Agent, or Firm* — Oliff PLC

(57) ABSTRACT

An information processing device includes a processor configured to provide an incentive to a first user who sells or returns a first vehicle in which a part of a first coating film including an easily peelable layer does not peeled off.

14 Claims, 14 Drawing Sheets

FIG. 6

| FIRST RATIO | Cf1 |
|---|---|
| 100% | 1.0 |
| 90% OR MORE | 0.8 |
| 80% OR MORE | 0.6 |
| 70% OR MORE | 0.4 |
| 60% OR MORE | 0.2 |
| LESS THAN 60% | 0 |

FIG. 9

| PORTION (SECOND RATIO) | Cf1 |
|---|---|
| NONE (100%) | 1.0 |
| FIRST PORTION (100%) | 0.9 |
| SECOND PORTION (90% OR MORE) | 0.8 |
| SECOND PORTION (80% OR MORE) | 0.6 |
| SECOND PORTION (70% OR MORE) | 0.4 |
| SECOND PORTION (60% OR MORE) | 0.2 |
| SECOND PORTION (LESS THAN 60%) | 0 |

FIG. 10

| LENGTH OF ELAPSED TIME | Cfa1 |
|---|---|
| LESS THAN 1 YEAR | 1.0 |
| LESS THAN 2 YEARS | 0.9 |
| LESS THAN 3 YEARS | 0.8 |
| LESS THAN 4 YEARS | 0.7 |
| LESS THAN 5 YEARS | 0.6 |
| 5 YEARS OR MORE | 0.5 |

FIG. 12

| DEGREE OF DEGRADATION | Cfa2 |
|---|---|
| NONE | 1.0 |
| SMALL | 0.9 |
| MEDIUM | 0.8 |
| LARGE | 0.7 |

INFORMATION PROCESSING DEVICE, INFORMATION PROCESSING METHOD, AND NON-TRANSITORY STORAGE MEDIUM

CROSS-REFERENCE TO RELATED APPLICATION

This application claims priority to Japanese Patent Application No. 2021-111895 filed on Jul. 6, 2021, incorporated herein by reference in its entirety.

BACKGROUND

1. Technical Field

The present disclosure relates to information processing devices, information processing methods, and non-transitory storage media.

2. Description of Related Art

A technique is known in which a reward (money, goods, points, etc.) is given to a user of a vehicle when the user performs a predetermined work that can be performed even by a person who is not a vehicle mechanic (see, for example, Japanese Unexamined Patent Application Publication No. 2020-064552 (JP 2020-064552 A)).

SUMMARY

The present disclosure provides a technique that is effective in reducing a decrease in commercial value of a vehicle.

A first aspect of the present disclosure is an information processing device. The information processing device includes a processor configured to provide an incentive to a first user who sells or returns a first vehicle from which a part of a first coating film including an easily peelable layer does not peeled off.

In the first aspect, the processor may be configured to, as a process of providing the incentive to the first user, acquire first information on a condition of the first coating film of the first vehicle and calculate the incentive to be provided to the first user based on the first information.

In the first aspect, the first information may has information on an area of a portion of the first vehicle. The portion of the first vehicle may be an area from which the first coating film does not peeled off. The processor may be configured to calculate the incentive such that the incentive increases as the area increases.

In the first aspect, the first information may have information on a length of elapsed time since application of the first coating film to the first vehicle, and the processor may be configured to calculate the incentive in such a way that the incentive increases as the length of elapsed time decreases.

In the first aspect, the first information may have information on a portion of the first vehicle from which the first coating film does not peeled off, and the processor may be configured to, when the portion of the first vehicle is a portion other than a first portion than when the portion of the first vehicle is the first portion, calculate the incentive such that the incentive is greater.

In the first aspect, the first portion may be a front bumper, a rear bumper, or a door mirror housing.

In the first aspect, the first information may have information on a degree of degradation on the first coating film of the first vehicle, and the processor may be configured to calculate the incentive such that the incentive increases as the degree of degradation decreases.

In the first aspect, the processor may be configured to calculate the incentive based on information showing market demand.

In the first aspect, the processor may be configured to calculate the incentive such that the incentive increases as demand for a color of an original paint of the first vehicle increases.

In the first aspect, the processor may be configured to send, to a first terminal, a request to remove the first coating film when a decision is made to sell or lease the first vehicle to a second user.

In the first aspect, the processor may be configured to publish, on a first website, information on the first vehicle together with information that the first coating film does not peeled off in a period from completion of purchase or return of the first vehicle from the first user to the decision to sell or lease the first vehicle to the second user.

A second aspect of the present disclosure is an information processing method. The information processing method includes providing by a computer an incentive to a first user who sells or returns a first vehicle from which a part of a first coating film including an easily peelable layer does not peeled off.

In the second aspect, the information processing method may have acquiring first information on a condition of the first coating film of the first vehicle as a process of providing the incentive to the first user by the computer and calculating the incentive to be provided to the first user based on the first information as the process of providing the incentive to the first user by the computer.

In the second aspect, the information processing method may have calculating the incentive by the computer such that the incentive increases as an area of a portion of the first vehicle. The area may be an area from which the first coating film does not peeled off increases. The first information may have information on the area.

In the second aspect, the information processing method may have calculating the incentive by the computer such that the incentive increases as a length of elapsed time since application of the first coating film to the first vehicle decreases. The first information may have information on the length of elapsed time.

In the second aspect, the information processing method may have calculating, when a portion of the first vehicle is a portion other than a first portion compared to the portion of the first vehicle being the first portion, the incentive by the computer such that the incentive is greater. The portion of the first vehicle may be a portion from which the first coating film does not peeled off, and the first information may have information on the portion of the first vehicle.

In the second aspect, the first portion may be a front bumper, a rear bumper, or a door mirror housing.

In the second aspect, the information processing method may further include calculating the incentive by the computer such that the incentive increases as a degree of degradation of the first coating film on the first vehicle decreases. The first information may have information on the degree of degradation.

In the second aspect, the information processing method may further include calculating the incentive by the computer based on information showing market demand.

A third aspect of the present disclosure is a non-transitory storage medium storing instructions that are executable by one or more processors in a computer and that cause the one or more processors to perform functions. The functions include providing an incentive to a first user who sells or returns a first vehicle from which a part of a first coating film including an easily peelable layer does not peeled off.

According to the first, second, and third aspects of the present disclosure, it is possible to provide a technology that is effective in reducing a decrease in commercial value of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 illustrates a method for determining a factor Cf1 in the embodiment;

FIG. 9 illustrates a method for determining the factor Cf1 in a first modification;

FIG. 10 illustrates a method for determining a first correction factor Cfa1 in a second modification;

FIG. 12 illustrates a method for determining a second correction factor Cfa2 in a third modification;

DETAILED DESCRIPTION OF EMBODIMENTS

Figure 1:
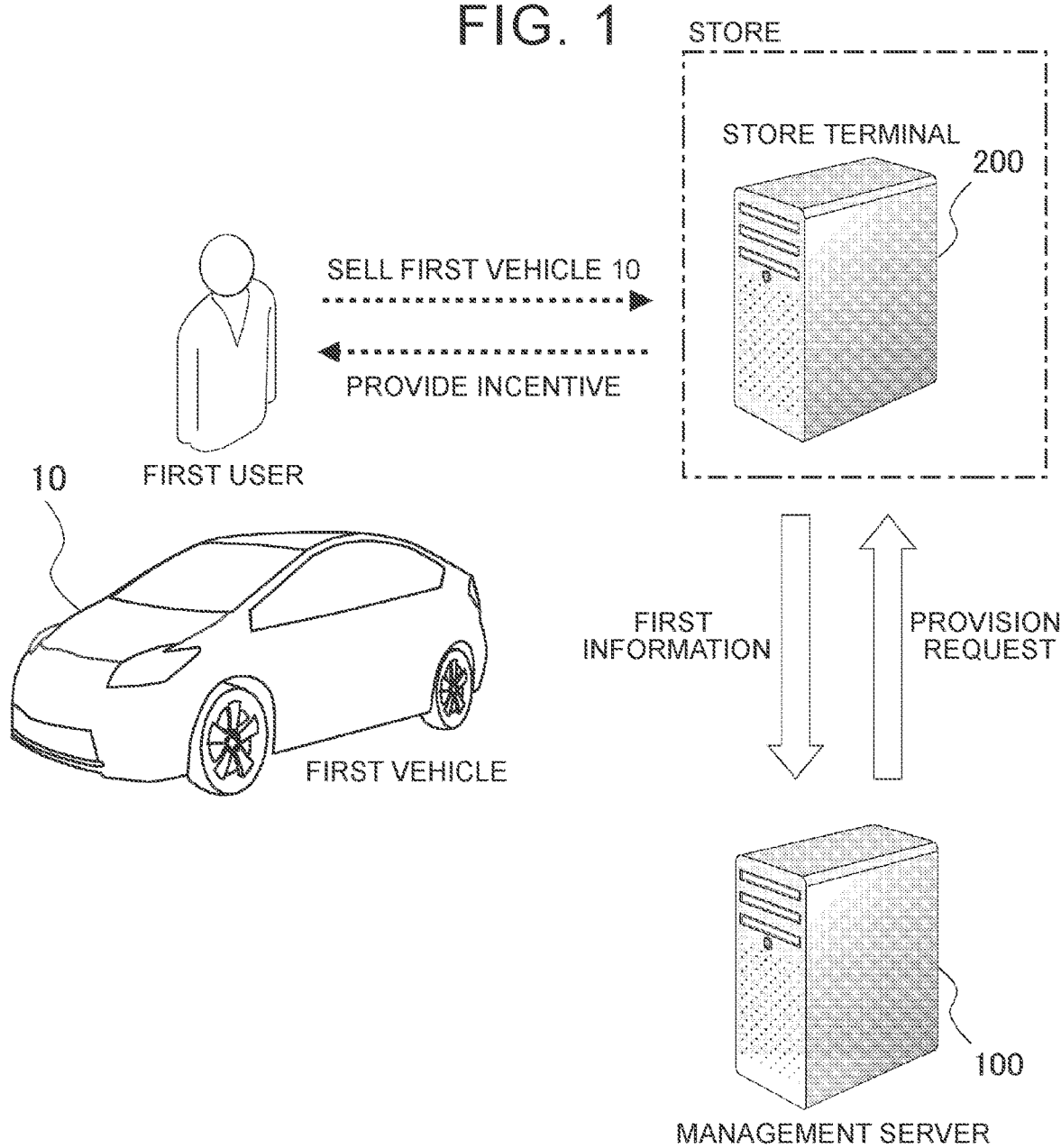
FIG. 1 shows an overview of a used vehicle sales system.

A technique of applying a removable paint to the body of a vehicle using a coating film (first coating film) including an easily peelable layer has been developed. The first coating film is a peelable coating film that is applied over an original paint applied to the body at the time of manufacturing the vehicle. The original paint is formed by forming an electrodeposition layer (undercoat) on the surface of a steel plate etc. that forms the body of the vehicle, sequentially forming an intermediate coat layer, a base layer, a clear layer (top coat), etc. on the electrodeposition layer. Since the original paint needs to be stripped with a dedicated solution such as paint stripper, it is not easy to strip the original paint. On the other hand, the first coating film is, for example, a combination of a film-like easily peelable layer formed on the original paint and a coating film (for example, base layer and clear layer) formed on the easily peelable layer. Therefore, the first coating film can be easily peeled off by applying force without using a dedicated solvent. The coating film of the first coating film itself may be a peelable film (easily peelable paint).

As described above, since the first coating film can be easily peeled off, the body color of the vehicle can be changed at any desired time. Therefore, when purchasing or leasing a vehicle, the user can choose the color of the original paint popular in the used vehicle market etc. The user can then apply the first coating film of a color different from the original paint to the vehicle and use the vehicle. When selling or returning the vehicle, the user may peel off the first coating film to return the body color of the vehicle to the color of the original paint. It is therefore possible to meet the needs of the user while ensuring a high resale value when the color that is popular in the used vehicle market etc. is different from the color the user likes.

In the vehicle with such a first coating film as described above, the coating film of the original paint is protected. Therefore, the resale value of such a vehicle can be increased as compared to vehicles with no first coating film. This makes it easier to find the next buyer or lessee of the vehicle and makes it possible to sell or lease the vehicle at a higher price. Therefore, if it is possible to motivate the user to treat the vehicle in such a way that the first coating film does not peel off, the vehicle purchased from the user or the vehicle returned from the user can be used beneficially.

Therefore, in an information processing device according to the present disclosure, a control unit performs a process of providing an incentive to a user (first user) who sells or returns a first vehicle from which at least a part of a first coating film (coating film including an easily peelable layer) does not peeled off. The first user can thus receive the incentive in return for having treated the first vehicle in such a way that the first coating film does not peel off. This can motivate the first user to treat the first vehicle in such a way that the first coating film does not peel off. As a result, a decrease in commercial value (resale value) of the first vehicle can be reduced.

As used herein, "at least a part of the first coating film does not peeled off" includes that the first coating film applied to the first vehicle does not peeled off at all, and that a part of the first coating film applied to the first vehicle does not peeled off. The incentive may not be provided when the proportion of the part that does not peeled off to the entire first coating film applied to the first vehicle is less than a predetermined threshold. As used herein, "sell the first vehicle" means, for example, that the first user sells the first vehicle to a business operator that provides a service of buying and selling used vehicles, or the first user trades in the first vehicle to a business operator that provides a service of selling new vehicles. As used herein, "return the first vehicle" means that the first user returns the first vehicle to a business operator that provides a service of leasing the first vehicle.

In the information processing device according to the present disclosure, the control unit may acquire first information on a condition of the first coating film of the first vehicle and calculate the incentive to be provided to the first user based on the first information, as a process of providing the incentive to the first user. In this case, the incentive to be provided to the first user can be changed according to the condition of the first coating film remaining without peeling off from the first vehicle. For example, the incentive to be provided to the first user may increase as the condition of the first coating film remaining without peeling off from the first vehicle is closer to a condition suitable for protecting the coating film of the original paint. This can motivate the first user to keep the first coating film in the condition suitable for protecting the coating film of the original paint.

The first information may include information on the area of a portion of the first vehicle from which the first coating film does not peeled off. In this case, the control unit may calculate the incentive in such a way that the incentive increases as the area of the portion from which the first coating film does not peeled off increases. This can motivate the first user to treat the first vehicle in such a way that the first coating film does not peel off or that the area of the portion from which the first coating film has peeled off does not increase. As a result, the area of the original paint protected by the first coating film can be increased.

The longer the length of elapsed time since application of the first coating film to the first vehicle, the larger the degree of degradation of the first coating film may be. As the degree of degradation of the first coating film increases, the first coating film's capability of protecting the original paint may decrease proportionally. Therefore, the first information may include information on the length of elapsed time since application of the first coating film to the first vehicle. In this case, the control unit may calculate the incentive in such a way that the incentive increases as the length of elapsed time since application of the first coating film to the first vehicle decreases. This can motivate the first user to sell or return the first vehicle before the length of elapsed time since application of the first coating film to the first vehicle becomes long. As a result, the first vehicle is more likely to be sold or returned before the first coating film's capability to protect the original paint decreases.

The first information may include information on the portion from which the first coating film does not peeled off. In this case, the control unit may calculate the incentive according to the portion from which the coating film does not peeled off. For example, the control unit may calculate the incentive in such a way that the incentive is greater when the portion from which the first coating film does not peeled off is a portion other than a first portion than when the portion from which the first coating film does not peeled off is the first portion (when the first coating film has peeled off from the portion other than the first portion). As used herein, the "first portion" is, for example, a portion with only a small coating area such as front bumper, rear bumper, or door mirror housing, and is a portion that can be easily repaired at low cost even when the original paint on that portion has been damaged. This can motivate the first user to treat the first vehicle in such a way that the first coating film does not peel off from a portion with a large coating area that is hard to repair at low cost when the original paint thereon has been damaged, such as roof panel, door panel, hood, fender panel, trunk lid, or rear gate. As a result, it is possible to reduce the effort and cost it takes to sell or lease the first vehicle purchased from the first user or the first vehicle returned from the first user.

The first information may include information on the degree of degradation of the first coating film on the first vehicle. In this case, the control unit may calculate the incentive to be provided to the first user in such a way that the incentive increases as the degree of degradation of the first coating film decreases. This can motivate the first user to treat the first vehicle in such a way that the first coating film does not degrade. The less the degradation of the first coating film, the more likely the original paint is to be satisfactorily protected. As a result, the resale value of the first vehicle can be increased.

The control unit may calculate the incentive in consideration of market demand in addition to the first information. As used herein, the "market" refers to, for example, a used vehicle market or a vehicle leasing market. The "demand" may be the demand for the model of the first vehicle, or may be the demand for the color of the original paint applied to the first vehicle. In this case, the control unit may calculate the incentive based on information showing the market demand. Specifically, the control unit may calculate the incentive in such a way that the incentive increases as the market demand increases. This is because the higher the market demand, the higher the price at which the first vehicle can be sold or leased if the original paint is in good condition.

The control unit may send a request to remove the first coating film to a first terminal when the next buyer or lessee (second user) of the first vehicle purchased or returned from the first user is found. As used herein, the "first terminal" referred to, for example, a terminal of a store that sells or rents (leases) the first vehicle to the second user. The first vehicle with the original paint exposed can thus be handed over to the second user. It is also possible to remind the employee of the store etc. when it is decided to sell or lease the first vehicle to the second user that it is necessary to remove the first coating film from the first vehicle. As a result, it is possible to store the first vehicle without removing the first coating film until the next buyer or lessee of the first vehicle is found. That is, it is possible to protect the original paint by the first coating film until the next buyer or lessee of the first vehicle is found.

The control unit may publish information on the first vehicle together with information that the first coating film does not peeled off on a first website in a period from completion of purchase or return of the first vehicle from the first user to the decision to sell or lease the first vehicle to the second user. As used herein, the "first website" referred to, for example, a website for advertising vehicles that are available for sale or lease to visitors of the web site. The visitors of the first web site can be aware that the original paint of the first vehicle is protected by the first coating film. That is, it is possible to advertise that the original paint of the first vehicle is in satisfactory condition (for example, is close to new condition).

Embodiment

Hereinafter, a specific embodiment of the present disclosure will be described with reference to the drawings. Configurations described in the present embodiment are not intended to limit the technical scope of the present disclosure to those configurations alone unless otherwise specified.

An example in which an information processing device according to the present disclosure is applied to a system that provides a service of buying and selling used vehicles (hereinafter sometimes referred to as "used vehicle sales system") is described in the present embodiment. The information processing device according to the present disclosure is also applicable to a system that provides a vehicle rental service (vehicle leasing service).

System Overview

FIG. 1 shows an overview of a used vehicle sales system to which the information processing device according to the present disclosure is applied. The used vehicle sales system in the present embodiment includes a management server device 100 that manages buying and selling of used vehicles, and a store terminal 200 used in a store that buys and sells used vehicles. Only one store terminal 200 is shown in the example of FIG. 1. However, when the management server device 100 manages a plurality of stores, the used vehicle sales system may include the same number of store terminals 200 as the stores.

The management server device 100 is a server device that manages buying and selling of used vehicles by the store. The management server device 100 is an example of the "information processing device" according to the present disclosure. The management server device 100 is operated by a business operator that provides a service of buying and selling used vehicles.

The management server device 100 of the present embodiment performs various processes for providing an incentive to a first user when the store buys a vehicle (first vehicle 10) from which a repaint coat does not peeled off. The first user is a seller of the first vehicle 10. The repaint coat is a peelable coating film that is applied over an original paint applied to the body at the time of manufacturing the first vehicle 10. The repaint coat corresponds to the "first coating film" according to the present disclosure. The repaint coat will be described in detail later.

When the store buys the first vehicle 10 from which the repaint coat does not peeled off, the management server device 100 calculates an incentive based on first information provided by the store terminal 200 described later (information on the condition of the repaint coat on the first vehicle 10), and sends a request to provide the calculated incentive to the first user (hereinafter sometimes referred to as "provision request") to the store terminal 200. As used herein, "the repaint coat does not peeled off" is not limited to the condition in which the repaint coat on the first vehicle 10 does not peeled off at all, and includes the condition in which a part of the repaint coat on the first vehicle 10 does not peeled off.

The store terminal 200 is a terminal that is used by an employee of the store that buys and sells used vehicles from and to users. In the present embodiment, when the store buys the first vehicle 10, the store terminal 200 accepts entry of the first information and provides the accepted first information to the management server device 100. The first information is entered by the employee of the store. When the store terminal 200 receives a provision request from the management server device 100, the store terminal 200 presents the received provision request to the employee of the store. The employee who has received this presentation can perform a procedure to provide an incentive according to the provision request to the first user.

The incentive in the present embodiment includes, for example, increasing the purchase price of the first vehicle 10, giving points that can be used at the store, giving a discount for the purchase of a used vehicle at the store, or giving a cashback. However, the incentive in the present disclosure is not limited to these, and may be in any form that is beneficial to the first user.

Repaint

Figure 2:
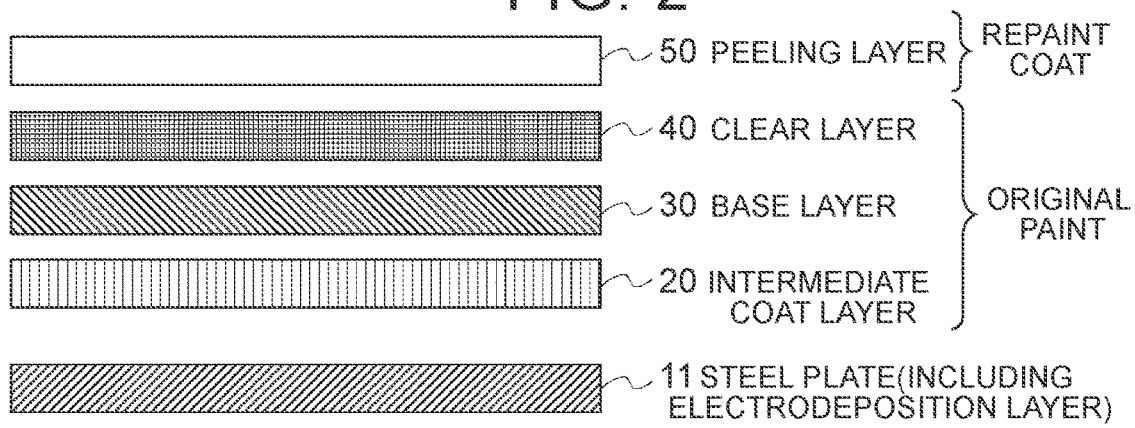
FIG. 2 shows a first example of the configuration of coating films that are applied to a first vehicle.

Painting of the first vehicle 10 will be described. FIG. 2 shows a schematic configuration of coating films applied to the first vehicle 10. As shown in FIG. 2, the original paint is applied to the surface of a steel plate 11 that forms the body of the first vehicle 10, and a repaint coat is applied over the original paint. The original paint includes an intermediate coat layer 20 formed on the surface of the steel plate 11, a base layer 30 formed on the intermediate coat layer 20, and a clear layer (top coat) 40 formed on the base layer 30. The steel plate 11 is undercoated with an electrodeposition layer. When members that form the body of the first vehicle 10 are made of resin, a primer layer may be formed instead of the intermediate coat layer 20 of the original paint. Since the original paint thus formed needs to be stripped with a dedicated solution such as paint stripper, it is not easy to strip the original paint.

The repaint coat includes a peeling layer 50 formed over the original paint (on the clear layer 40). The peeling layer 50 is a layer of an easily peelable paint and has properties of being easily peeled off by applying a force to the peeling layer 50. The peeling layer 50 illustrated in FIG. 2 corresponds to the "coating film including the easily peelable layer (first coating film)" according to the present disclosure. Such a peeling layer 50 is formed by applying an easily peelable paint over the original paint by, for example, a spraying method. The easily peelable paint is a paint containing, for example, xylene, ethylbenzene, an antioxidant, methyl ethyl ketone, a silica reactant, titanium oxide (nanoparticles), and an organic solvent. A clear layer may be formed on the peeling layer 50.

Figure 3:
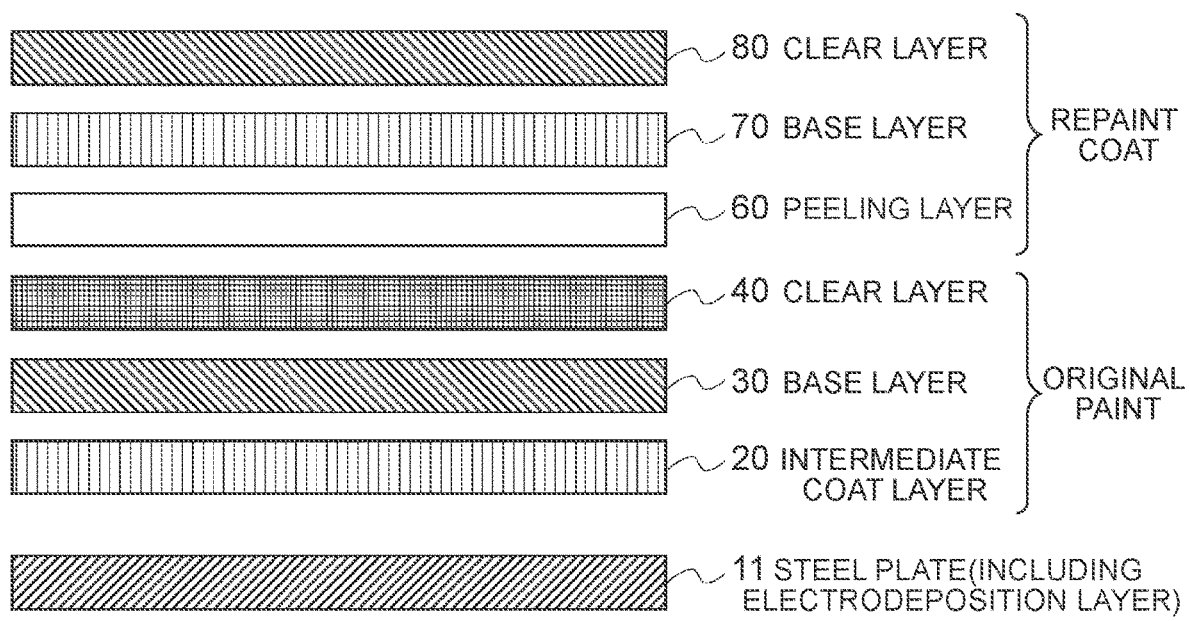
FIG. 3 shows a second example of the configuration of coating films that are applied to the first vehicle.

The repaint coat shown in FIG. 2 is made of a paint with peelability. However, the configuration of the repaint coat is not limited to the example of FIG. 2, and the repaint coat may be any coating film with easy peelability. For example, as shown in FIG. 3, a peeling layer 60 may be formed on the clear layer 40 of the original paint, and a base layer 70 and a clear layer 80 may be formed on the peeling layer 60. The peeling layer 60 shown in FIG. 3 is a no-colored layer formed using a material similar to that of the peeling layer 50 in FIG. 2. In that case, the peeling layer 60 corresponds to the "easily peelable layer" according to the present disclosure, and the repaint coat including the peeling layer 60, the base layer 70, and the clear layer 80 corresponds to the "coating film including the easily peelable layer (first coating film)." The repaint coat shown in FIG. 3 can be easily peeled off from the original paint by applying a force to the peeling layer 60.

By using such a repaint coat, the body color of the first vehicle 10 can be easily changed to a color different from the color of the original paint. Moreover, the body color of the first vehicle 10 can be easily returned to the color of the original paint by peeling off the repaint coat. Therefore, when purchasing the first vehicle 10, the user can choose the color of the original paint popular in the used vehicle market etc. The user can then apply a repaint coat of a color different from the original paint to the first vehicle 10 and use the first vehicle 10. When selling the first vehicle 10 in the used vehicle market etc., the user can peel off the repaint coat to return the body color of the first vehicle 10 to the color of the original paint that is popular in the used vehicle market etc. This makes it easier to find a buyer, and makes it possible to sell the first vehicle 10 for a higher price. In particular, if the repaint coat does not peeled off at the time of selling the first vehicle 10 in the used vehicle market etc., the original paint has been protected by the repaint coat. This increases the market value of the first vehicle 10. Accordingly, for the business operator that provides a service of buying and selling used vehicles, buying a vehicle from which a repair coat does not peeled off from a user can increase the profit when selling that vehicle.

System Configuration

Figure 4:
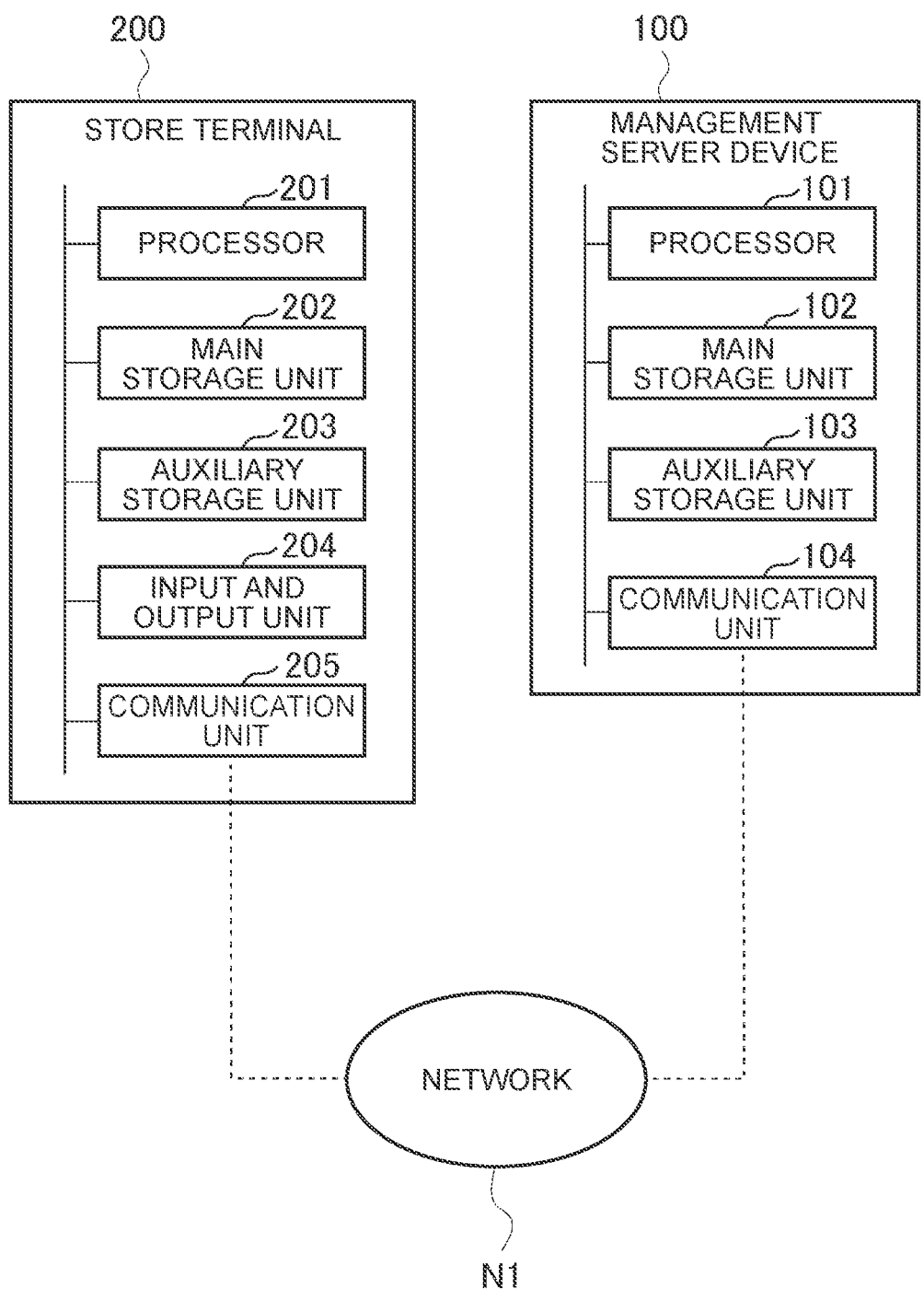
FIG. 4 shows an example of the hardware configurations of a management device and store terminal that are included in the used vehicle sales system.

FIG. 4 shows an example of the hardware configurations of the management server device 100 and store terminal 200 included in the used vehicle sales system according to the present embodiment.

The management server device 100 is a computer installed in an office etc. that supervises the store. As shown in FIG. 4, the management server device 100 includes a processor 101, a main storage unit 102, an auxiliary storage unit 103, and a communication unit 104. The processor 101, the main storage unit 102, the auxiliary storage unit 103, and the communication unit 104 are connected to each other by a bus. The hardware configuration of the management server device 100 is not limited to the example of FIG. 4. Any components may be omitted, replaced, or added as appropriate.

The processor 101 controls the management server device 100 by performing various information processing calculations. Such a processor 101 is, for example, a central processing unit (CPU) or a digital signal processor (DSP).

The main storage unit 102 is a storage device that is used as a recording area for loading a program stored in the auxiliary storage unit 103 or as a buffer for temporarily storing, for example, calculation results of the processor 101. Such a main storage unit 102 includes, for example, a semiconductor memory such as read-only memory (ROM) and random access memory (RAM).

The auxiliary storage unit 103 stores, for example, program to be executed by the processor 101 and data to be used when the processor 101 executes the programs. Such an auxiliary storage unit 103 includes, for example, an erasable programmable read-only memory (EPROM) or a hard disk drive (HDD). The auxiliary storage unit 103 may include a removable medium. For example, the removable medium may be a disc recording medium such as compact disc (CD) or digital versatile disc (DVD), or may be a Universal Serial Bus (USB) memory. The programs stored in the auxiliary storage unit 103 include, in addition to an operating system (OS), an application program related to provision of an incentive. Part or all of the information stored in the auxiliary storage unit 103 may be stored in the main storage unit 102.

The communication unit 104 is a communication interface for connecting the management server device 100 to a network N1. The communication unit 104 connects to the network N1 using, for example, a communication network such as local area network (LAN). The communication unit 104 may connect to the network N1 using a wireless communication network such as Wi-Fi (registered trademark). The communication unit 104 communicates with other device (for example, the store terminal 200) via the network N1.

The network N1 is, for example, a wide area network (WAN) that is a global public communication network such as the Internet, or other communication network. The network N1 may include a telephone communication network such as mobile phone network or a wireless communication network such as Wi-Fi (registered trademark).

The store terminal 200 is a computer that is used by the employee of the store that buys and sells used vehicles. The store terminal 200 may be a stationary computer installed in the store, or may be a tablet computer that can be carried by the employee of the store. As shown in FIG. 4, the store terminal 200 includes a processor 201, a main storage unit 202, an auxiliary storage unit 203, an input and output unit 204, and a communication unit 205. The processor 201, the main storage unit 202, the auxiliary storage unit 203, the input and output unit 204, and the communication unit 205 are connected to each other by a bus. The hardware configuration of the store terminal 200 is not limited to the example of FIG. 4. Any components may be omitted, replaced, or added as appropriate.

Since the processor 201, the main storage unit 202, the auxiliary storage unit 203, and the communication unit 205 are similar to the processor 101, the main storage unit 102, the auxiliary storage unit 103, and the communication unit 104 of the management server device 100, description thereof will be omitted. The communication unit 205 may be configured to connect to the network N1 using a mobile communication service such as 5th generation (5G) or Long Term Evolution (LTE).

The input and output unit 204 accepts an input operation performed by the employee of the store and presents information to the employee. The input and output unit 204 is composed of, for example, a keyboard and its control circuit, and a liquid crystal display and its control circuit. The input and output unit 204 may include a touch panel display instead of the keyboard and the liquid crystal display.

The store terminal 200 configured as described above has a function to implement interaction with the employee. For example, the store terminal 200 implements a function to accept entry of the first information by the employee, a function to provide the accepted first information to the management server device 100, and a function to present a provision request received from the management server device 100 to the employee. These functions are implemented by a browser that runs on the store terminal 200 or the application program stored in the auxiliary storage unit 203. Part or all of these functions that are implemented by the store terminal 200 may be implemented by a hardware circuit such as application specific integrated circuit (ASIC) or field programmable gate array (FPGA).

Functional Configuration of Management Server Device

Next, the functional configuration of the management server device 100 will be described with reference to FIG. 5. The management server device 100 in the present embodiment may be configured to be able to implement a web server for interacting with the store terminal 200. In that case, the store terminal 200 accesses the web server through the browser to make it possible to make a contract to buy the first vehicle 10 from the first user, provide the first information to the management server device 100, receive a provision request from the management server device 100, etc. The management server device 100 may provide a service similar to that described above by means other than the web server. For example, the management server device 100 may perform a process of implementing interaction with the store terminal 200 by the application program installed in the store terminal 200 and a predetermined protocol.

Figure 5:
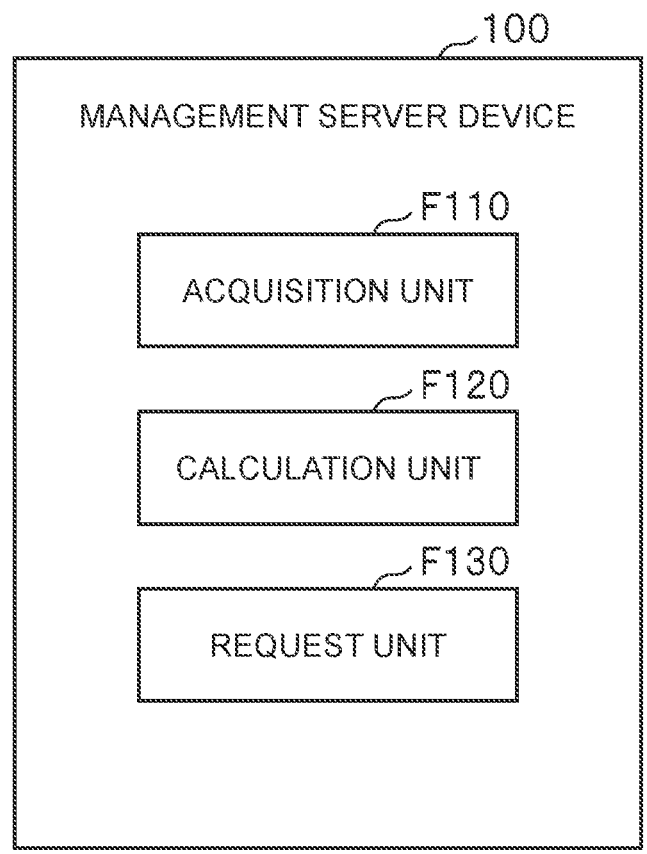
FIG. 5 is a block diagram showing an example of the functional configuration of the management server device in an embodiment.

As shown in FIG. 5, the management server device 100 that implements the above functions includes an acquisition unit F110, a calculation unit F120, and a request unit F130 as its functional components. The acquisition unit F110, the calculation unit F120, and the request unit F130 are implemented by the processor 101 executing programs stored in the auxiliary storage unit 103. The processor 101 that implements the above functional components corresponds to the "control unit" according to the present disclosure. All or part of the acquisition unit F110, the calculation unit F120, and the request unit F130 may be implemented by a hardware circuit such as ASIC or FPGA.

The acquisition unit F110 is one of the functional components for implementing the web server, and interacts with the store terminal 200. For example, when the store terminal 200 accesses a predetermined web page (for example, a web page for entering information necessary for a contract to buy the first vehicle 10, or a web page for entering information indicating that a contract to buy the first vehicle 10 has been made) through the browser, the acquisition unit F110 causes the browser of the store terminal 200 to display an input screen for entering the first information. As described above, the first information is information indicating the condition of the repaint coat on the first vehicle 10. In other words, the first information is information indicating the condition of the repaint coat remaining on the first vehicle 10 without peeling off. When the first information is entered on the input screen, the acquisition unit F110 acquires the entered first information. The acquisition unit F110 sends the acquired first information to the calculation unit F120.

The calculation unit F120 calculates an incentive to be provided to the first user based on the first information. The calculation unit F120 of the present embodiment uses, as the first information, information on the area of a portion of the first vehicle 10 from which the repaint coat does not peeled off. Specifically, the calculation unit F120 uses, as the first information, the ratio of the area of the portion from which the repaint coat does not peeled off to the initial area of the repaint coat (hereinafter sometimes referred to as "first ratio"). In that case, the calculation unit F120 calculates the incentive by such a method that the higher the first ratio, the greater the incentive to be provided to the first user.

For example, the calculation unit F120 first determines a factor Cf1 based on the relationship as shown in FIG. 6. As shown in FIG. 6, the factor Cf1 is a positive value of 1.0 or less, and is set such that the higher the first ratio, the greater the factor Cf1 is. In the example shown in FIG. 6, the factor Cf1 is set to "0" when the first ratio is less than 60%. When the first ratio is 60% or more, the factor Cf1 is set such that the higher the first ratio, the greater the factor Cf1 is. The factor Cf1 is set to its maximum value of "1.0" when the first ratio is 100% (when the repaint coat does not peeled off at all). The relationship as shown in FIG. 6 may be stored in the form of a map in the auxiliary storage unit 103, or may be stored in the form of a calculation model in the auxiliary storage unit 103. The numerical values of the first ratio and factor Cf1 in FIG. 6 are shown by way of example only, and are not limited to the example of FIG. 6.

Once the calculation unit F120 determines the factor Cf1 by the method as described above, the calculation unit F120 calculates the incentive to be provided to the first user by multiplying a reference value Icdef of the incentive by the factor Cf1. The reference value Icdef is an upper limit value of the incentive, and corresponds to a value of the incentive (amount of money, number of points, etc.) to be provided when the repaint coat does not peeled off at all. When the first ratio is 60% or more, the incentive calculated in this way increases as the first ratio increases. When the first ratio is less than 60%, the incentive to be provided to the first user is "0" (no incentive will be provided to the first user). The calculation unit F120 sends the calculated incentive to the request unit F130.

The method for calculating the incentive is not limited to the above method. Any calculation method may be used as long as the incentive is calculated in such that the larger the area of the portion of the first vehicle 10 from which the repaint coat does not peeled off, the greater the incentive. For example, the incentive may be calculated by such a method that the larger the absolute value of the area of the portion of the first vehicle 10 from which the repaint coat does not peeled off, the greater the incentive.

Referring back to FIG. 5, like the acquisition unit F110, the request unit F130 is one of the functional components for implementing the web server, and interacts with the store terminal 200. For example, the request unit F130 displays a provision request on the browser of the store terminal 200. This provision request includes, for example, the incentive calculated by the calculation unit F120 and a message prompting the employee of the store to provide the incentive to the first user. The employee who sees such a provision request can provide the incentive calculated by the calculation unit F120 to the first user.

The functional configuration of the management server device 100 is not limited to the example of FIG. 5, and any functional components can be omitted, changed, or added as appropriate.

Process Flow

Figure 7:
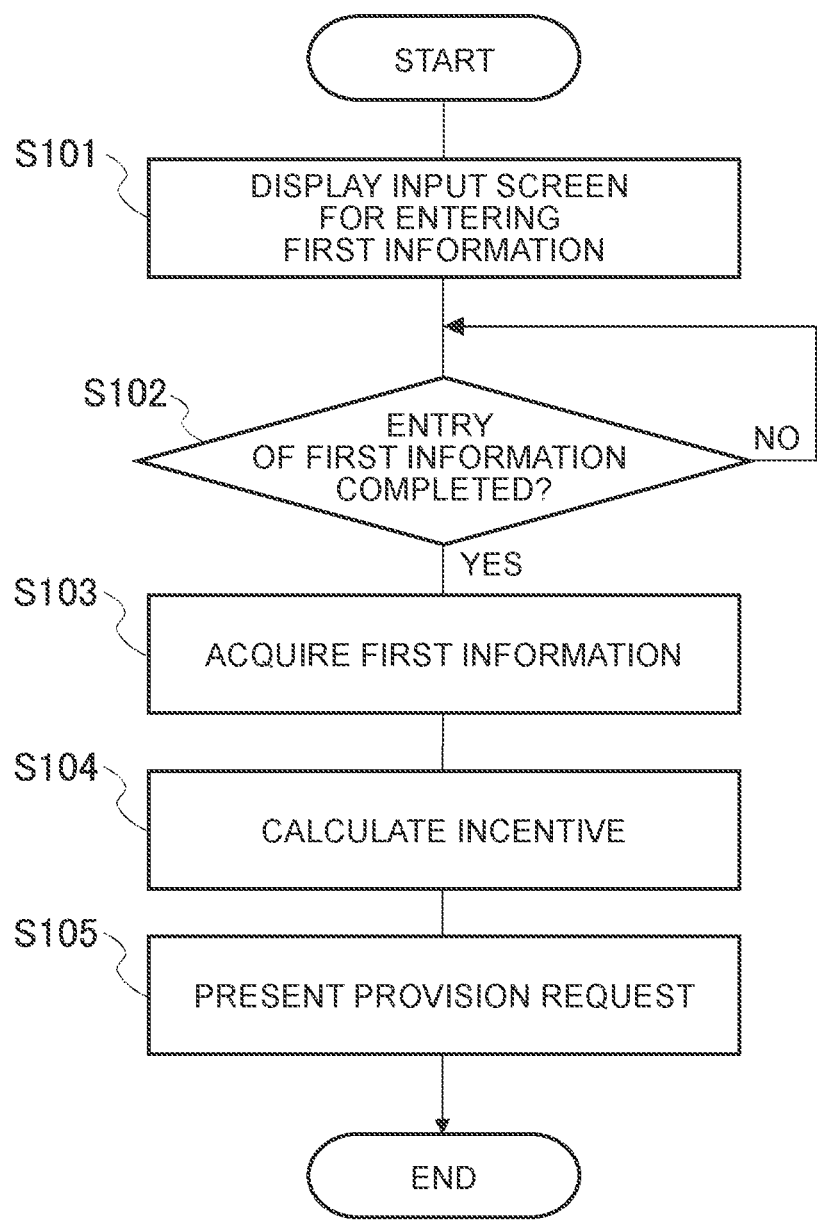
FIG. 7 is a flowchart showing a processing routine that is executed by the management server device in the embodiment.
Figure 8:
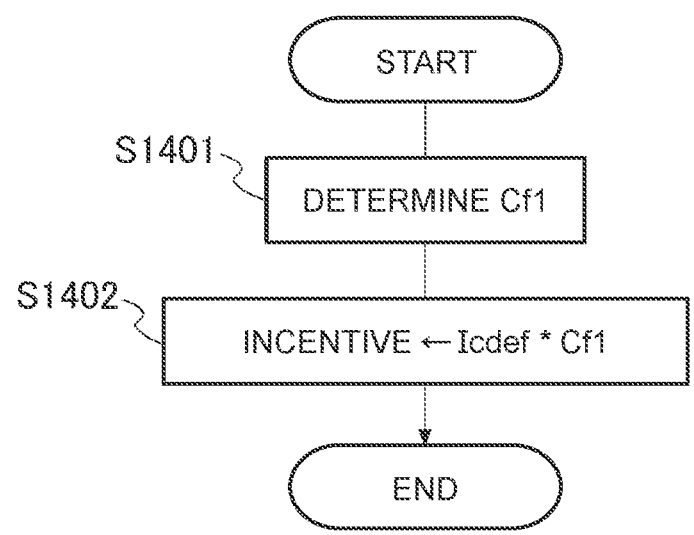
FIG. 8 is a flowchart showing a subroutine that is executed by the management server device in the embodiment.

The flow of a process that is performed by the management server device 100 in the present embodiment will be described with reference to FIGS. 7 and 8. FIG. 7 is a flowchart showing a process routine that is executed when the store terminal 200 accesses the predetermined web page through the browser. FIG. 8 is a flowchart showing a subroutine that is executed in step S104 of FIG. 7. The processor 101 of the management server device 100 mainly performs the process shown in FIGS. 7 and 8. However, the description will be given mainly using the functional components of the management server device 100.

When the store terminal 200 accesses the predetermined web page through the browser, the acquisition unit F110 causes the browser of the store terminal 200 to display an input screen for entering the first information (step S101) as shown in FIG. 7. When the acquisition unit F110 finishes step S101, it performs step S102.

In step S102, the acquisition unit F110 determines whether entry of the first information on the input screen is completed. When entry of the first information on the input screen is not completed (no in step S102), the acquisition unit F110 waits until entry of the first information is completed. When entry of the first information on the input screen is completed (yes in step S102), the acquisition unit F110 performs step S103.

In step S103, the acquisition unit F110 acquires the first information entered on the input screen. The acquisition unit F110 sends the acquired first information to the calculation unit F120. The calculation unit F120 performs step S104 in response to reception of the first information.

In step S104, the calculation unit F120 calculates an incentive to be provided to the first user based on the first information received from the acquisition unit F110. At this time, the calculation unit F120 calculates the incentive to be provided to the first user according to the subroutine of FIG. 8.

In FIG. 8, the calculation unit F120 determines the factor Cf1 based on the first information received from the acquisition unit F110 (step S1401). For example, the calculation unit F120 determines the factor Cf1 based on the first information and the relationship shown in FIG. 6. When the calculation unit F120 finishes step S1401, it performs step S1402.

In step S1402, the calculation unit F120 calculates the incentive to be provided to the first user by multiplying the reference value Icdef of the incentive by the factor Cf1 determined in step S1401. The subroutine of FIG. 8 ends when the calculation unit F120 finishes step S1402.

Referring back to the process routine of FIG. 7, the calculation unit F120 sends the incentive calculated in step S104 (steps S1401 to S1402) to the request unit F130. The request unit F130 performs step S105 in response to reception of the incentive calculated by the calculation unit F120.

In step S105, the request unit F130 presents a provision request to the employee of the store. For example, the request unit F130 causes the browser of the store terminal 200 to display a provision request. Accordingly, the employee who sees the provision request displayed on the store terminal 200 can provide the incentive calculated by the management server device 100 to the first user.

The process routine of FIG. 7 ends when the request unit F130 finishes step S105.

Effects of Embodiment

According to the above embodiment, when the first ratio is high (for example, 60% or more), an incentive is provided to the first user who sells the first vehicle 10. That is, when selling the first vehicle 10, the first user can receive an incentive in return for having treated the first vehicle 10 in such a way that the first vehicle 10 has a high first ratio. This can motivate the first user to treat the first vehicle 10 in such a way that the first vehicle 10 has a high first ratio. The higher the first ratio, the greater the incentive that the first user can receive. Therefore, this can encourage the first user to treat the first vehicle 10 in such a way that the first vehicle 10 has a higher first ratio.

Therefore, the business operator that provides a service of buying and selling used vehicles can buy the first vehicle 10 with a larger area of the original paint protected by the repaint coat from the first user. As a result, it is easier for the business operator to find the next buyer of the first vehicle 10, and the business operator can sell the first vehicle 10 to the next buyer at a higher price.

First Modification

An example in which only the first ratio (ratio of the area of the portion from which the repaint coat does not peeled off to the initial area of the repaint coat) is used as the first information is described in the above embodiment. However, information indicating the portion from which the repaint coat does not peeled off may be used in addition to the first ratio.

In the case where the repaint coat has peeled off only from a portion with only a small coating area (first portion) such as front bumper, rear bumper, or door mirror housing, this portion can be repaired at low cost even when the original paint on this portion has been damaged. On the other hand, in the case where the repaint coat has peeled off from a portion with a large coating area (hereinafter sometimes referred to as "second portion") such as roof panel, door panel, hood, fender panel, trunk lid, or rear gate, it is difficult to repair this portion at low cost when the original paint on this portion has been damaged.

Therefore, in this modification, the incentive to be provided to the first user is calculated by such a method that the incentive is greater when the repaint coat has peeled off only from the first portion (when the repaint coat does not peeled off from the second portion) than when the repaint coat has peeled off from the second portion (when the repaint coat does not peeled off from the first portion). When the repaint coat has peeled off from the second portion, the incentive can be calculated based on the first ratio as in the above embodiment.

The calculation unit F120 determines the factor Cf1 based on the relationship as shown in FIG. 9. In the example of FIG. 9, the factor Cf1 is set to "0" when the ratio of the area of the part of the second portion from which the repaint coat does not peeled off to the area of the second portion (hereinafter sometimes referred to as "second ratio") is less than 60%. When the second ratio is 60% or more, the factor Cf1 is set in such a way that the higher the second ratio, the larger the factor Cf1. When the repaint coat has peeled off from the first portion but does not peeled off from the second portion (when the second ratio is 100%), the factor Cf1 is set to a value larger than when the repaint coat has peeled off from the second portion. When the repaint coat has peeled off from neither the first portion nor the second portion, the factor Cf1 is set to its maximum value of "1.0." The numerical values of the second ratio and factor Cf1 in FIG. 9 are shown by way of example only, and are not limited to the example of FIG. 9.

The calculation unit F120 calculates the incentive to be provided to the first user by multiplying the reference value Icdef of the incentive by the factor Cf1 determined based on the relationship in FIG. 9. When the repaint coat has peeled off from the second portion and the second ratio is 60% or more, the incentive calculated in this way increases as the second ratio increases. The incentive to be provided to the first user is "0" (no incentive will be provided to the first user) when the repaint coat has peeled off from the second portion and the second ratio is less than 60%. The incentive to be provided to the first user is greater when the repaint coat has peeled off only from the first portion (when the repaint coat does not peeled off from the second portion) than when the repaint coat has peeled off from the second portion.

Therefore, according to this modification, the first user is motivated to treat the first vehicle 10 in such a way that the repaint coat does not peel off from the second portion. This can reduce the effort and cost it takes to sell the first vehicle 10 purchased from the first user.

An example in which the portions of the first vehicle 10 are classified into two types, namely the first portion and the second portion, is described in the modification. However, the portions of the first vehicle 10 may be classified into three or more types according to the coating area, repair cost, etc.

Second Modification

An example in which only the first ratio (ratio of the area of the portion from which the repaint coat does not peeled off to the initial area of the repaint coat) is used as the first information is described in the above embodiment. However, the length of elapsed time since application of the repaint coat to the first vehicle 10 may be used in addition to the first ratio.

The repaint coat may degrade as the length of elapsed time since application of the repaint coat increases. In particular, the longer the length of elapsed time, the greater the degree of degradation of the repaint coat may be. As the degree of degradation of the repaint coat increases, the repaint coat's capability of protecting the original paint may decrease proportionally. On the other hand, if the business operator that provides a service of buying and selling used vehicles can make the first user sell the first vehicle 10 before the length of elapsed time since application of the repaint coat becomes long, the business operator can buy the first vehicle 10 with a satisfactorily protected original paint from the first user.

Therefore, in this modification, the incentive is calculated by such a method that the higher the first ratio and the shorter the length of elapsed time since application of the repaint coat, the greater the incentive to be provided to the first user.

The calculation unit F120 of this modification determines a first correction factor Cfa1 based on the relationship as shown in FIG. 10, in addition to determining the factor Cf1 by a method similar to that of the above embodiment. As shown in FIG. 10, the first correction factor Cfa1 is a positive value of 1.0 or less, and is set such that the shorter the length of elapsed time since application of the repaint coat, the greater the first correction factor Cfa1. The numerical values of the length of elapsed time and first correction factor Cfa1 in FIG. 10 are shown by way of example only, and are not limited to the example of FIG. 10.

Once the calculation unit F120 determines the factor Cf1 and the first correction factor Cfa1 by the method as described above, the calculation unit F120 calculates the incentive to be provided to the first user by multiplying the reference value Icdef of the incentive by the factor Cf1 and the first correction factor Cfa1. The incentive calculated in this way increases as the first ratio increases and the length of elapsed time decreases.

Process Flow

Figure 11:
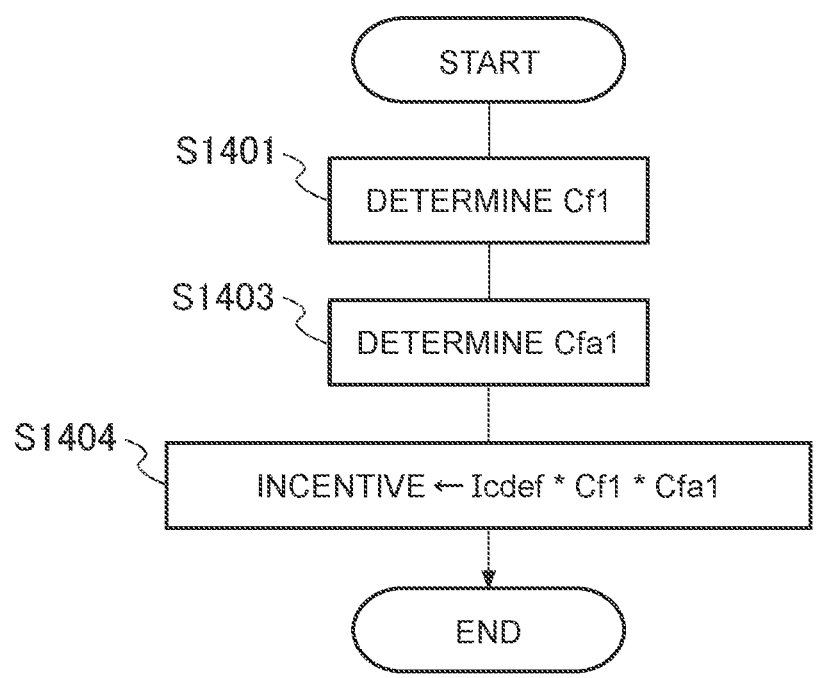
FIG. 11 is a flowchart showing a subroutine that is executed by the management server device in the second modification.

The flow of a process that is performed by the management server device 100 in this modification will be described with reference to FIG. 11. FIG. 11 is a flowchart showing a subroutine that is executed instead of the subroutine of FIG. 8 in step S104 of FIG. 7. In FIG. 11, the step similar to that of FIG. 8 is denoted by the same sign as that of FIG. 8.

In FIG. 11, when the calculation unit F120 finishes step S1401, it performs step S1403. In step S1403, the calculation unit F120 determines the first correction factor Cfa1. Specifically, the calculation unit F120 determines the first correction factor Cfa1 based on the length of elapsed time since application of the repaint coat and the relationship shown in FIG. 10. The first correction factor Cfa1 is thus determined in such a way that the shorter the length of elapsed time since application of the repaint coat, the larger the first correction factor Cfa1. When the calculation unit F120 finishes step S1403, it performs step S1404.

In step S1404, the calculation unit F120 calculates the incentive to be provided to the first user by multiplying the reference value Icdef of the incentive by the factor Cf1 determined in step S1401 and the first correction factor Cfa1 determined in step S1403. The subroutine of FIG. 11 ends when the calculation unit F120 finishes step S1404.

According to this modification, the higher the first ratio and the shorter the length of elapsed time since application of the repaint coat, the greater the incentive to be provided to the first user who sells the first vehicle 10. This can motivate the first user to treat the first vehicle 10 in such a way that the first vehicle 10 has a higher first ratio, and also motivates the first user to sell the first vehicle 10 before the length of elapsed time since application of the repaint coat becomes long. As a result, the business operator that provides a service of buying and selling used vehicles can buy the first vehicle 10 with a higher resale value from the first user.

Third Modification

An example in which the first ratio and the length of elapsed time since application of the repaint coat are used as the first information is described in the second modification. However, the first ratio and the degree of degradation of the repaint coat may be used as the first information. That is, the degree of degradation of the repaint coat may be used instead of the length of elapsed time since application of the repaint coat used in the second modification.

As described in the second modification, as the degree of degradation of the repaint coat increases, the repaint coat's capability of protecting the original paint may decrease proportionally. On the other hand, if the business operator that provides a service of buying and selling used vehicles can encourage the first user to sell the first vehicle 10 before the degree of degradation of the repaint coat becomes large or can encourage the first user to treat the first vehicle 10 in such a way that the degree of degradation of the repaint coat does not become large, the business operator can buy the first vehicle 10 with a satisfactorily protected original paint from the first user.

Therefore, in this modification, the incentive is calculated by such a method that the higher the first ratio and the smaller the degree of degradation of the repaint coat, the greater the incentive to be provided to the first user.

The calculation unit F120 of this modification determines a second correction factor Cfa2 based on the relationship as shown in FIG. 12, in addition to determining the factor Cf1 by a method similar to that of the above embodiment. As shown in FIG. 12, the second correction factor Cfa2 is a positive value of 1.0 or less, and is set such that the smaller the degree of degradation of the repaint coat, the larger the second correction factor Cfa2. The degrees of degradation and the numerical values of the second correction factor Cfa2 in FIG. 12 are shown by way of example only, and are not limited to the example of FIG. 12.

Once the calculation unit F120 determines the factor Cf1 and the second correction factor Cfa2 by the method as described above, the calculation unit F120 calculates the incentive to be provided to the first user by multiplying the reference value Icdef of the incentive by the factor Cf1 and the second correction factor Cfa2. The higher the first ratio and the smaller the degree of degradation of the repaint coat, the greater the incentive calculated in this way.

Process Flow

Figure 13:
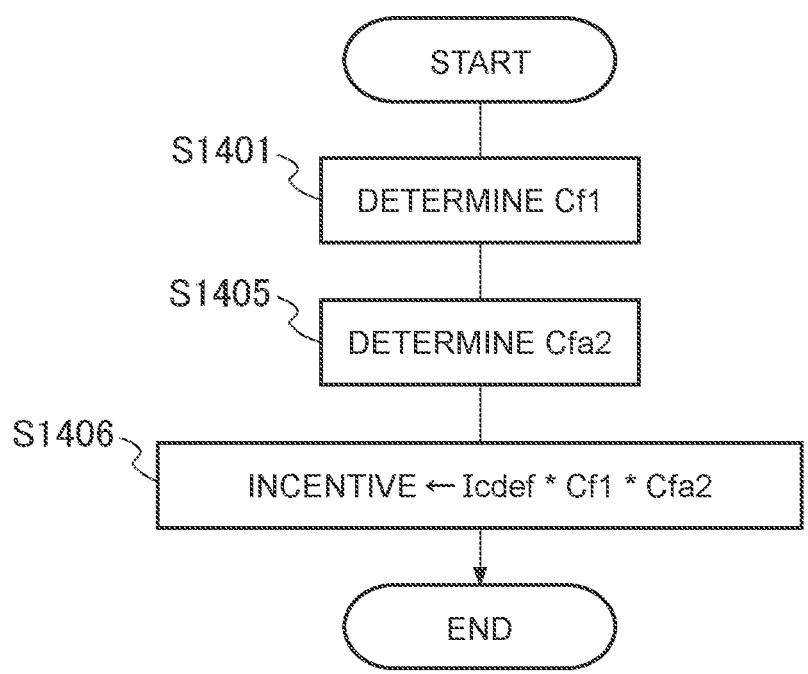
FIG. 13 is a flowchart showing a subroutine that is executed by the management server device in the third modification.

The flow of a process that is performed by the management server device 100 in this modification will be described with reference to FIG. 13. FIG. 13 is a flowchart showing a subroutine that is executed instead of the subroutine of FIG. 8 in step S104 of FIG. 7. In FIG. 13, the step similar to that of FIG. 8 is denoted by the same sign as that of FIG. 8.

In FIG. 13, when the calculation unit F120 finishes step S1401, it performs step S1405. In step S1405, the calculation unit F120 determines the second correction factor Cfa2. Specifically, the calculation unit F120 determines the second correction factor Cfa2 based on the degree of degradation of the repaint coat and the relationship shown in FIG. 12. Accordingly, the second correction factor Cfa2 is determined in such a way that the smaller the degree of degradation of the repaint coat, the larger the second correction factor Cfa2. When the calculation unit F120 finishes step S1405, it performs step S1406.

In step S1406, the calculation unit F120 calculates the incentive to be provided to the first user by multiplying the reference value Icdef of the incentive by the factor Cf1 determined in step S1401 and the second correction factor Cfa2 determined in step S1405. The subroutine of FIG. 13 ends when the calculation unit F120 finishes step S1406.

According to this modification, the higher the first ratio and the smaller the degree of degradation of the repaint coat, the greater the incentive to be provided to the first user who sells the first vehicle 10. This can motivate the first user to treat the first vehicle 10 in such a way that the first vehicle 10 has a higher first ratio, and can also motivate the first user to treat the first vehicle 10 in such a way that the repaint coat does not degrade (or can motivate the first user to sell the first vehicle 10 before the degree of degradation of the repaint coat becomes large). As a result, the business operator that provides a service of buying and selling used vehicles can buy the first vehicle 10 with a higher resale value from the first user.

Since the degree of degradation of the repaint coat is information included in the first information, it is necessary to determine the degree of degradation of the repaint coat at the store. The degree of degradation of the repaint coat may be determined, for example, visually by the employee of the store, or may be determined using a dedicated device. For example, the degree of degradation of the repaint coat may be determined using a device that determines the degree of degradation of a paint by image processing using a deep learning method, or a device that determines the degree of degradation of a paint by optically detecting the reflectance of a coating film.

Fourth Modification

An example in which the incentive to be provided to the first user is calculated based on the first information is described in the above embodiment and the first to third modifications. However, the incentive to be provided may be calculated in consideration of the demand in the used vehicle market in addition to the first information.

In the used vehicle market, vehicles of models in higher demand or vehicles with body colors in higher demand tend to be traded at higher prices. Therefore, the incentive calculated based on the first information may be corrected based on information indicating the demand in the used vehicle market. For example, the incentive to be provided to the first user may be set such that the higher the demand for the model of the first vehicle 10 and/or the higher the demand for the color of the original paint of the first vehicle 10, the greater the incentive.

According to this modification, when the demand for the first vehicle 10 is high, the first user is motivated to treat the first vehicle 10 in such a way that the repaint coat is kept in satisfactory condition. As a result, the business operator that provides a service of buying and selling used vehicles can buy the first vehicle 10 with a higher resale value from the first user.

Fifth Modification

The business operator that provides a service of buying and selling used vehicles needs to find a buyer of the first vehicle 10 purchased from the first user. One method to efficiently find a buyer of the first vehicle 10 is to post information including an image of the first vehicle 10 on a web page operated by the business operator. When using this method, advertising that the original paint of the first vehicle 10 is protected by the repaint coat makes it easier to find a second user and to sell the first vehicle 10 at a higher price.

Figure 14:
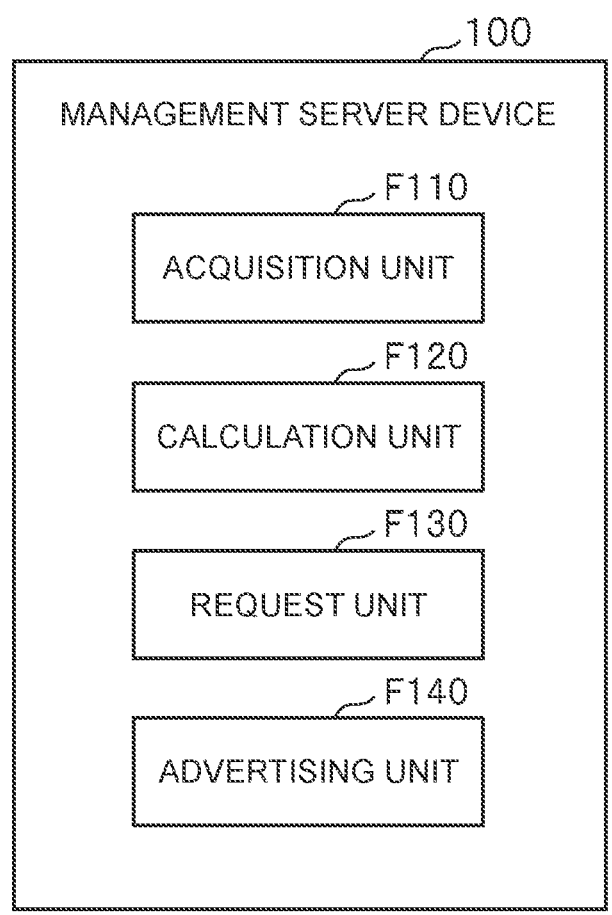
FIG. 14 is a block diagram showing an example of the functional configuration of the management server device in a fifth modification.

Therefore, in this modification, the management server device 100 posts the information including this selling point on the web page. FIG. 14 is a block diagram showing an example of a functional configuration of the management server device 100 in this modification. As shown in FIG. 14, the management server device 100 in this modification includes as its functional components an advertising unit F140 in addition to the acquisition unit F110, the calculation unit F120, and the request unit F130.

The advertising unit F140 implements a web server and implements interaction with an unspecified but large number of terminals. The web server implemented by the advertising unit F140 is not intended to interact only with the store terminal 200 like the web server implemented by the acquisition unit F110 and the request unit F130, but is intended to interact with an unspecified but large number of terminals. That is, the web server implemented by the advertising unit F140 is not configured to allow only a specific terminal to access the web page, but is configured to allow an unspecified but large number of terminals to access the web page.

Figure 15:
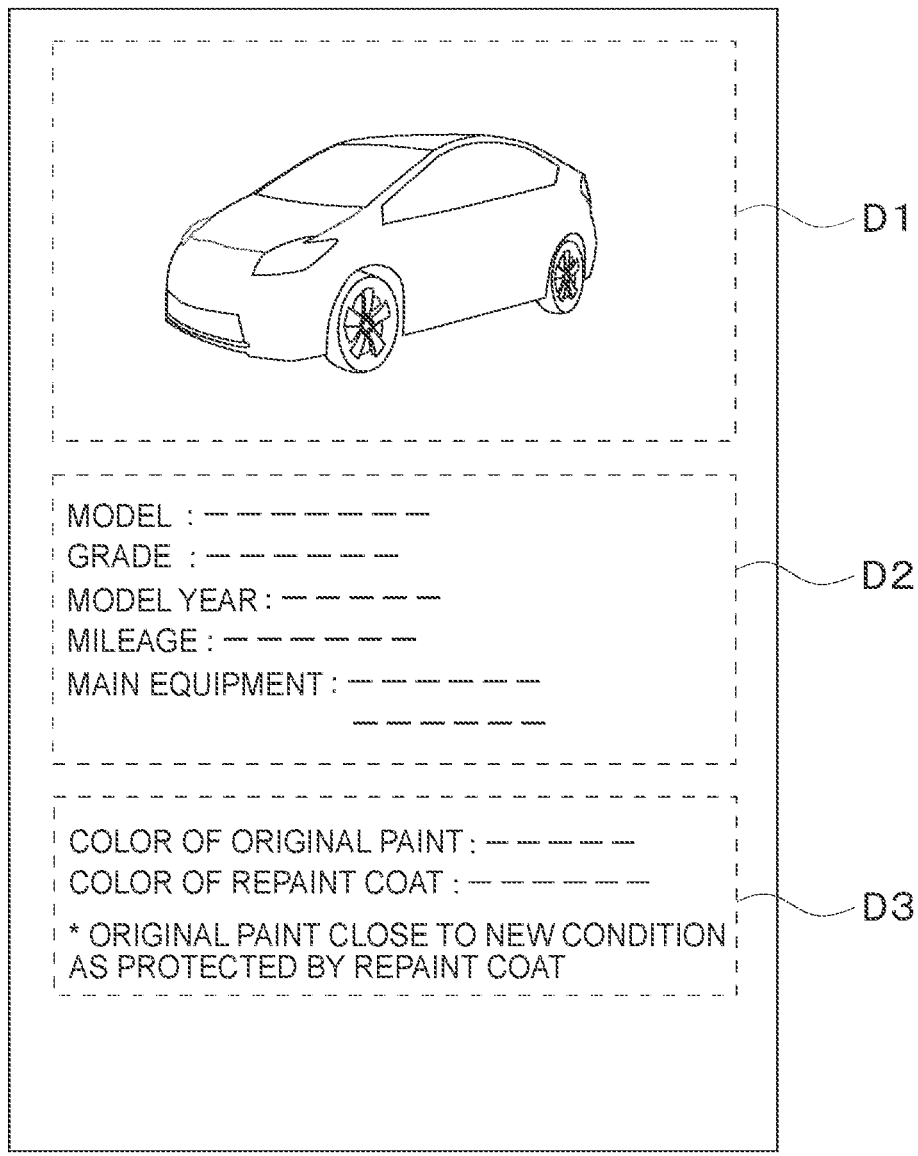
FIG. 15 shows an example of an advertising screen posted on a web page in the fifth modification.

The advertising unit F140 causes a browser of a terminal that accesses the web server to display an advertising screen of the first vehicle 10. As shown in FIG. 15, the advertising screen in this modification includes, for example, an image of the first vehicle 10 (D1 in FIG. 15), textual information showing an overview of the first vehicle 10 (D2 in FIG. 15), and textual information showing selling points of the first vehicle 10 (D3 in FIG. 15).

The textual information showing an overview of the first vehicle 10 includes, for example, information on the model, grade, model year, mileage, and main equipment of the first vehicle 10. The textual information showing the selling points of the first vehicle 10 includes, for example, information on the color of the original paint and the color of the repaint coat, and information that the original paint is protected by the repaint coat (information that the original paint is close to new condition).

Viewers of the advertising screen are thus aware of the color of the original paint of the first vehicle 10, and are also aware that the original paint is protected by the repaint coat. It is therefore possible to increase the viewers' motivation to buy the first vehicle 10 as compared to vehicles with no repaint coat. It is possible to further increase the viewers' motivation to buy the first vehicle 10 particularly when the color of the original paint is the color the viewers like.

The original paint can be kept in satisfactory condition by storing the first vehicle 10 without removing the repaint coat during a period from purchase of the first vehicle 10 from the first user until the next buyer is found. When a second user who will be the next buyer of the first vehicle 10 is found, it is necessary to remove the repaint coat from the first vehicle 10. If the employee of the store forgets to remove the repaint coat, delivery of the first vehicle 10 to the second user may be delayed or the second user may be less satisfied with the store.

Accordingly, the request unit F130 of the management server device 100 may send a request to remove the first coating film to the store terminal 200 via the communication unit 104 when the second user who will be the next buyer of the first vehicle 10 is found. This can remind the employee of the store that the first coating film needs to be removed before the first vehicle 10 is delivered to the second user.

OTHERS

The embodiment and first to fifth modifications described above are merely illustrative, and the present disclosure can be modified as appropriate without departing from the spirit and scope of the present disclosure. For example, part or all of the processes that are performed by the management server device 100 may be performed by another device (for example, the store terminal 200).

The processes and means described in the present disclosure may be combined as desired as long as no technical contradiction occurs. For example, the embodiment and the first to fifth modifications may be combined as much as possible. The process described as being performed by a single device may be performed cooperatively by a plurality of devices. Alternatively, the process described as being performed by different devices may be performed by a single device. The hardware configuration that implements functions in the computer system can be flexibly changed.

The present disclosure may be embodied by supplying computer programs (information processing programs) that implement the functions described in the above embodiment to a computer and causing one or more processors of the computer to read and execute the computer programs. Such computer programs may be provided to the computer by a non-transitory computer-readable storage medium that can be connected to a system bus of the computer, or may be provided to the computer via a network. The non-transitory computer-readable storage medium is a recording medium that can store information such as data and programs by electrical, magnetic, optical, mechanical, or chemical action and that can be read from a computer etc. Examples of such a recording medium include any types of disk or disc such as magnetic disks (for example, floppy (registered trademark) disk or HDD) and optical discs (for example, compact disc read-only memory (CD-ROM), digital versatile disc (DVD), or Blu-ray disc). Other examples of the recording medium include media such as ROM, RAM, EPROM, electrically erasable programmable read-only memory (EEPROM), magnetic card, flash memory, optical card, or solid state drive (SSD).

What is claimed is:

1. An information processing system comprising:
   a device configured to use image processing with a deep learning method or a device configured to optically detect a reflectance; and
   a processor programmed to:
      acquire coating information on a first coating film including a non-peeled area ratio and a degree of degradation, the first coating film forming a peelable layer on an exterior of a vehicle that covers an original paint layer, the non-peeled area ratio being a ratio of an area of the first coating film that is not peeled off from the vehicle to an area of the first coating film that is initially applied to the vehicle, the degree of degradation of the first coating film being determined by the device configured to use image processing with the deep learning method or the device configured to optically detect the reflectance,
      calculate, based on the non-peeled area ratio and the degree of degradation, an incentive to be provided to a first user who sells or returns the vehicle, such that the higher the non-peeled area ratio, the greater the incentive, and the smaller the degree of degradation, the greater the incentive, and
      cause a first terminal device to display the incentive,
   wherein the first terminal device is an in-store terminal that is used by an employee of a store that buys and sells used vehicles, and
   wherein the processor is programmed to send, to a second terminal device, a request to remove the first coating film when a decision is made to sell or lease the vehicle to a second user.

2. The information processing system according to claim 1, wherein:
   the coating information has information on a length of elapsed time since application of the first coating film to the vehicle; and
   the processor is programmed to modify the incentive such that the incentive increases if the length of elapsed time decreases.

3. The information processing system according to claim 1, wherein:
   the processor is programmed to, if a predetermined portion of the vehicle has the first coating film peeled off, modify the incentive.

4. The information processing system according to claim 3, wherein the predetermined portion is a front bumper, a rear bumper, or a door mirror housing.

5. The information processing system according to claim 1, wherein the processor is programmed to calculate the incentive based on information regarding market demand.

6. The information processing system according to claim 5, wherein the processor is programmed to modify the incentive such that the incentive increases if demand for a color of an original paint of the vehicle increases.

7. The information processing system according to claim 1, wherein the processor is programmed to publish, on a first website, information on the vehicle together with information that the first coating film is not peeled off in a period from completion of purchase or return of the vehicle from the first user to the decision to sell or lease the vehicle to the second user.

8. The information processing server system according to claim 1, further comprising a storage that stores a first predetermined map that correlates the non-peeled area ratio to a first correction factor, and a second predetermined map that correlates the degree of degradation to a second correction factor, and
   the processor is programmed to calculate the incentive using the first correction factor and the second correction factor.

9. An information processing method implemented with a system including a server comprising:
   controlling a device configured to use image processing with a deep learning method or a device configured to optically detect a reflectance to acquire image data;
   acquire coating information on a first coating film including a non-peeled area ratio and a degree of degradation, the first coating film forming a peelable layer on an exterior of a vehicle that covers an original paint layer, the non-peeled area ratio being a ratio of an area of the first coating film that is not peeled off from the vehicle to an area of the first coating film that is initially applied to the vehicle, the degree of degradation of the first coating film being determined by the device configured to use image processing with the deep learning method or the device configured to optically detect the reflectance;
   calculating based on the non-peeled area ratio and the degree of degradation, an incentive to be provided to a first user who sells or returns the vehicle, such that the higher the non-peeled area ratio, the greater the incentive, and the smaller the degree of degradation, the greater the incentive; and
   causing a first terminal device to display the incentive,
   wherein the first terminal device is an in-store terminal that is used by an employee of a store that buys and sells used vehicles, and
   wherein the server sends, to a second terminal device, a request to remove the first coating film when a decision is made to sell or lease the vehicle to a second user.

10. The information processing method according to claim 9, wherein calculating the incentive includes modifying the incentive so as to increase when as a length of elapsed time since application of the first coating film to the vehicle decreases, wherein
   the coating information has information on the length of elapsed time.

11. The information processing method according to claim 9, further comprising modifying the incentive, in response to determining that a predetermined portion of the vehicle has the first coating film peeled off, wherein the coating information has information on the predetermined portion of the vehicle.

12. The information processing method according to claim 11, wherein the predetermined portion is a front bumper, a rear bumper, or a door mirror housing.

13. The information processing method according to claim 9, further comprising calculating the incentive based on information regarding market demand.

14. A non-transitory computer-readable storage medium storing instructions that are executable by one or more processors in a system and that cause the one or more processors to perform functions comprising:
controlling a device configured to use image processing with a deep learning method or a device configured to optically detect a reflectance to acquire image data; and
acquire coating information on a first coating film including a non-peeled area ratio and a degree of degradation, the first coating film forming a peelable layer on an exterior of a vehicle that covers an original paint layer, the non-peeled area ratio being a ratio of an area of the first coating film that is not peeled off from the vehicle to an area of the first coating film that is initially applied to the vehicle, the degree of degradation of the first coating film being determined by the device configured to use image processing with the deep learning method or the device configured to optically detect the reflectance,
calculating based on the non-peeled area ratio and the degree of degradation, an incentive to be provided to a first user who sells or returns the vehicle, such that the higher the non-peeled area ratio, the greater the incentive, and the smaller the degree of degradation, the greater the incentive, and
causing a first terminal device to display the incentive,
wherein the first terminal device is an in-store terminal that is used by an employee of a store that buys and sells used vehicles, and
wherein the computer sends, to a second terminal device, a request to remove the first coating film when a decision is made to sell or lease the vehicle to a second user.

* * * * *